(12) United States Patent
Cheah et al.

(10) Patent No.: US 7,679,605 B2
(45) Date of Patent: Mar. 16, 2010

(54) OPTICAL MOUSE WITH BARCODE READING FUNCTION

(75) Inventors: Chiang Sun Cheah, Penang (MY); Chin-heong Yeoh, Penang (MY); Li Chong Tai, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 1084 days.

(21) Appl. No.: 11/066,836

(22) Filed: Feb. 25, 2005

(65) Prior Publication Data

US 2006/0192761 A1 Aug. 31, 2006

(51) Int. Cl.
*G06F 3/033* (2006.01)
*G09G 5/08* (2006.01)

(52) U.S. Cl. ...................... 345/166; 345/163

(58) Field of Classification Search .......... 345/163–166
See application file for complete search history.

(56) References Cited

U.S. PATENT DOCUMENTS

| | | | |
|---|---|---|---|
| 5,196,684 A * | 3/1993 | Lum et al. | 235/462.42 |
| 5,448,050 A | 9/1995 | Kostizak | |
| 6,303,924 B1 * | 10/2001 | Adan et al. | 250/221 |
| 2002/0117549 A1 | 8/2002 | Lee | |
| 2003/0168512 A1 * | 9/2003 | Longacre et al. | 235/454 |
| 2004/0000589 A1 * | 1/2004 | Smith et al. | 235/462.01 |
| 2005/0103864 A1 * | 5/2005 | Zhu et al. | 235/462.42 |

* cited by examiner

*Primary Examiner*—Kevin M Nguyen
*Assistant Examiner*—Cory A Almeida

(57) ABSTRACT

An optical computer mouse has a support structure that can be moved across a surface. An illumination source that illuminates a region of the surface is coupled to the support structure. An imaging system in the mouse includes an optical sensor array that receives light from the illuminated region of the work surface and an image processor that receives data from the optical sensor array. The optical computer mouse may be switched between a navigation mode of operation, in which the image processor detects motion of the optical computer mouse over the work surface, and a barcode reading mode of operation, in which the image processor senses a barcode as the optical computer mouse is moved across a barcode.

17 Claims, 4 Drawing Sheets

OPTICAL MOUSE WITH BARCODE READING FUNCTION

FIELD

This invention relates generally to the field of computer input peripherals. More particularly, this invention relates to an optical computer mouse for screen navigation and barcode reading.

BACKGROUND

A computer mouse measures motion of the mouse and converts the motion to an electrical signal that may be used to control a pointer on a computer screen. A computer mouse also provides buttons to allow a user to interact with the computer. Commonly, computer mice sense and encode the motion of a ball as it moves across a surface. This type of mouse is called a mechanical mouse and includes mechanical moving parts. More recently an optical computer mouse has been introduced that uses changes between consecutive images of a surface to estimate motion of the mouse over a surface. This design avoids the use of moving parts.

A barcode reader or scanner is an optical device that is moved across a printed barcode pattern on an object. A photo-diode in the reader converts the light and dark lines of the barcode pattern into an electrical signal that can be decoded to provide information about the object. The decoding measures the durations of the high and low portions of the signal and uses these measurements to estimate the relative widths of the barcode line. The decoding is accurate provided that the motion of the reader across the barcode is reasonably steady and even.

Barcode readers have been combined with mechanical computer mice. This provides a convenience to the user, but does not provide any reduction in complexity, since an optical bar code reader has no parts in common with a mechanical mouse.

SUMMARY

The present invention relates generally to an optical computer mouse having a barcode reading capability. Objects and features of the invention will become apparent to those of ordinary skill in the art upon consideration of the following detailed description of the invention.

In one embodiment of the invention the imaging and processing system of an optical mouse is used to provide a barcode reading function.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION

Figure 1:
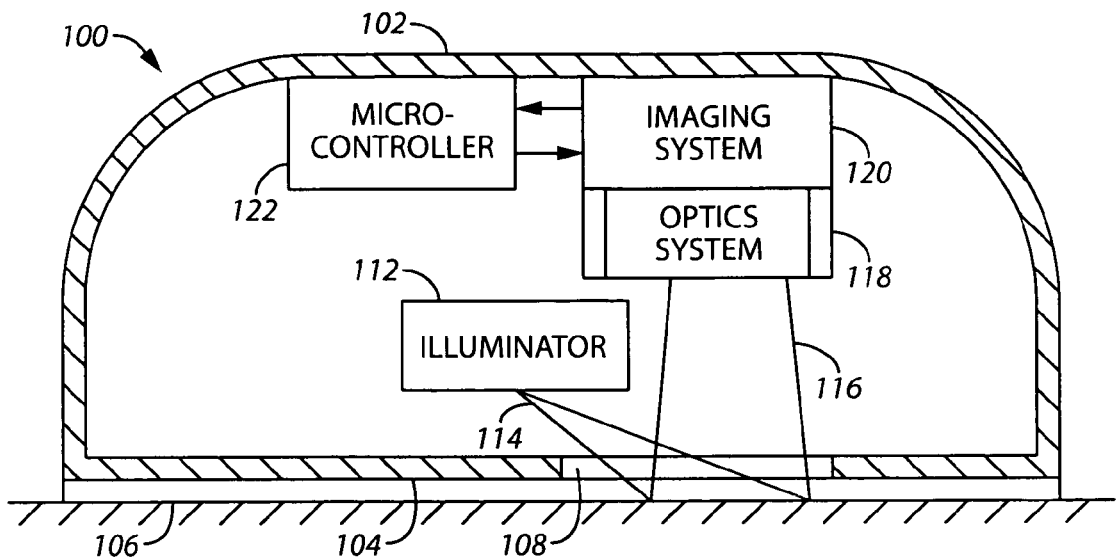
FIG. 1 is a sectional view of an optical computer mouse consistent with an embodiment of the invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

FIG. 1 is a sectional view of an optical computer mouse consistent with an embodiment of the invention. The mouse 100 includes a housing 102 having a bottom wall 104 that moves across an opaque or reflecting work surface 106. The bottom wall 104 of the mouse contains an aperture 108 to allow light to pass. An illuminator 112, which includes an illumination source and associated illumination optics, is positioned within the housing. The illumination source may be a light emitting diode (LED) or other source of non-coherent light. Light 114 from this illuminator 112 illuminates a region of the work surface 106. A portion 116 of the light 114 is reflected from the surface and enters the housing through the aperture 108. In the housing, the light passes through an optical coupling system 118 and is focused on an array of optical sensing elements that forms part of an imaging system 120. The imaging system 120 includes the array of optical sensing elements, a memory for storing frames of digitized optical sensor outputs and a means for estimating motion from successive frames of digitized optical sensor outputs. Signals representing the motion of the mouse are communicated via microcontroller 122 to a computer using a wired or wireless communication channel.

The imaging system 120 and the microcontroller 122 may be configured to detect motion of the mouse 100 over the surface 106, or to read a barcode marked on the surface 106.

Figure 2:
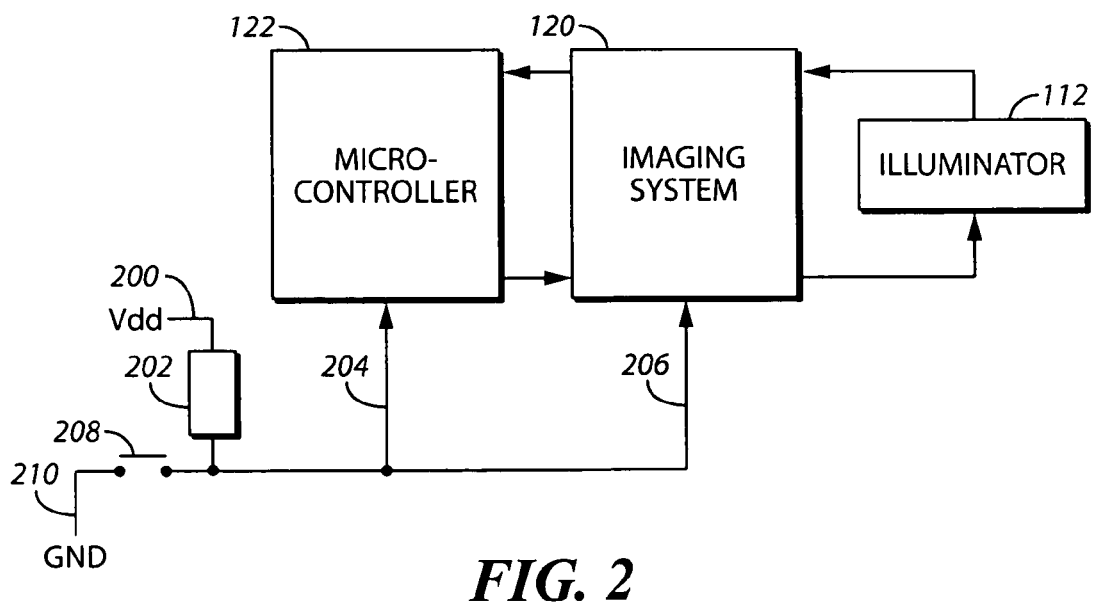
FIG. 2 is a block diagram of an optical computer mouse consistent with an embodiment of the invention.

FIG. 2 is a block diagram of an optical computer mouse consistent with an embodiment of the invention. FIG. 2 shows an example of how the mode of operation of the imaging system 120 and the microcontroller 122 may be switched between a navigation mode (in which motion of the mouse over the surface is detected) and a barcode reading mode. Referring to FIG. 2, a voltage signal (Vdd) 200, is coupled through a resistor 202 to provide a control signal 204 to the microcontroller 122 and a control signal 206 to the imaging system 120. When the switch 208 is open, the voltage signal 200 is coupled to the microcontroller 122 and the imaging system 120 and the signals 204 and 206 are 'high'. When the switch 208 is closed, the voltage signal is coupled to ground 210 and the signals 204 and 206 are 'low'. In one embodiment, the switch 208 is provided as a button on the mouse. The signals 204 and 206 may be used as interrupt signals to alter the operation of the microcontroller 122 and imaging system 120. In one embodiment, the optical mouse operates in a barcode reading mode only while a mouse button held depressed.

Figure 3:
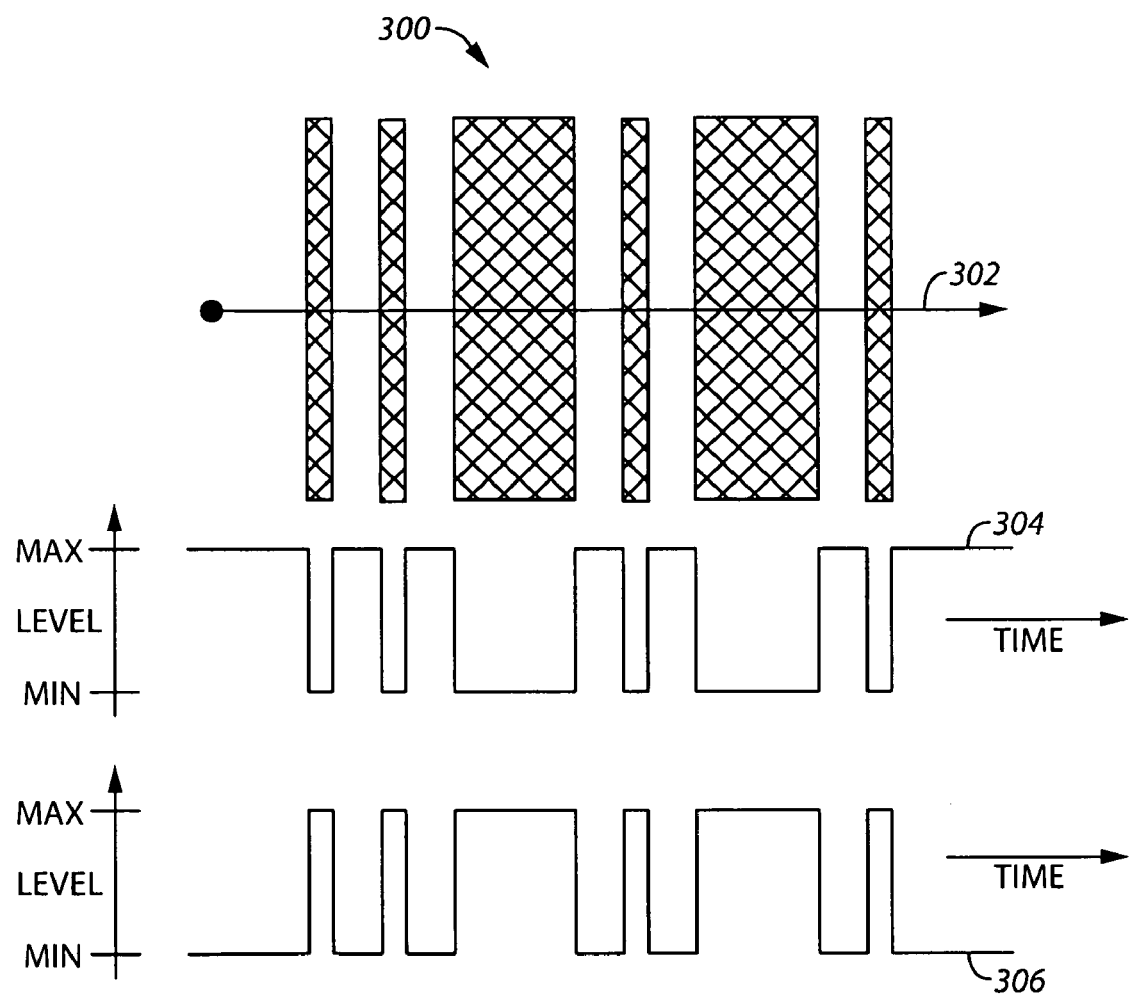
FIG. 3 is a diagram of an exemplary barcode together with plots of corresponding signals generated by an optical computer mouse consistent with an embodiment of the invention.

FIG. 3 is a diagram of an exemplary barcode together with corresponding signals generated by an optical computer mouse consistent with an embodiment of the invention. The top diagram in FIG. 3 shows a portion 300 of an exemplary bar code that consists of a pattern of light and dark lines of various thicknesses. When the barcode is illuminated by a light source and an optical sensor is moved across the bar code in the direction indicated by the arrow 302, the voltage output from the sensor varies with time as shown in the graph 304. This signal may be inverted as shown in the graph 306. The optical sensor may be an element of an array of photo-detectors, such as photo-diodes.

In accordance with an aspect of the present invention, one or more optical sensing elements of the array of optical sensing elements in an optical computer mouse are used to detect the light and dark regions of a barcode as the optical mouse is moved across the bar code.

Figure 4:
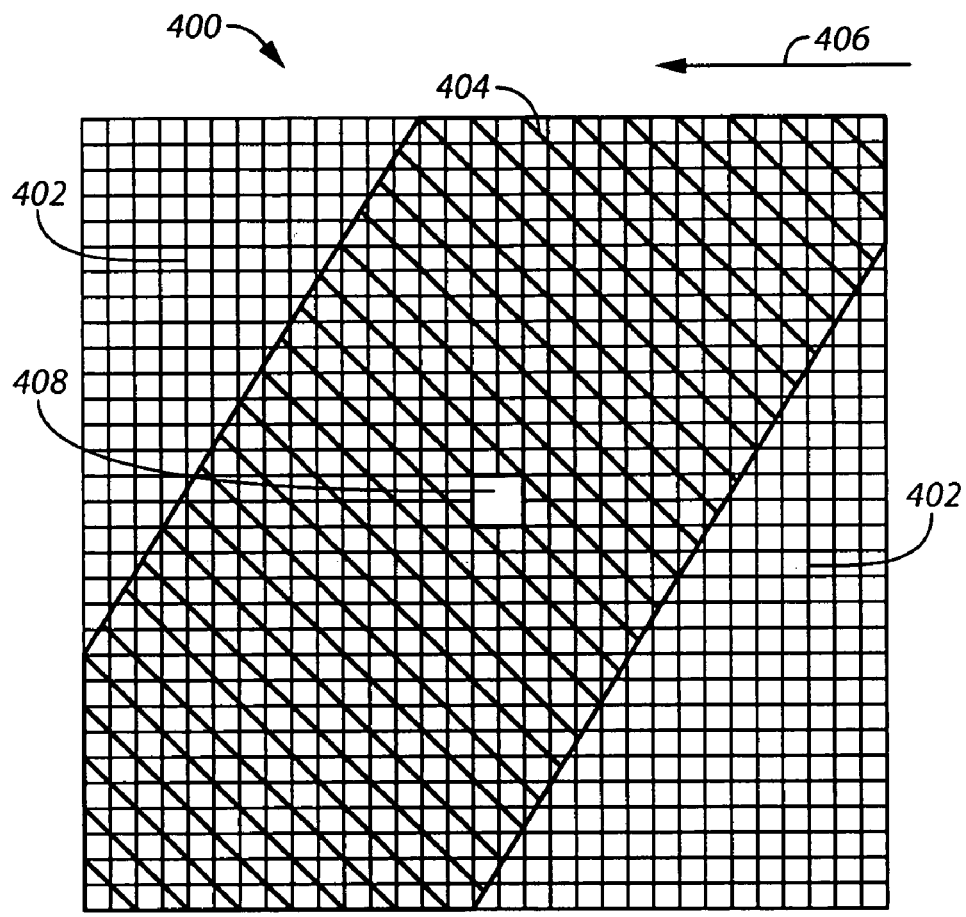
FIG. 4 is a diagram of an imaging array of an optical computer mouse consistent with an embodiment of the invention.

FIG. 4 is a diagram of an imaging array 400 of an optical computer mouse consistent with an embodiment of the invention. In this example, the array 400 comprises 30×30 optical sensing elements, but other size arrays may be used. At time T0, as shown in the figure, the light regions of the barcode reflect light to the regions 402 of the imaging array, while the dark portion of the barcode absorbs light, so that very little light falls on the region 404 of the imaging array. In this example, the dark region 404 moves across the array in the direction of arrow 406 (as the mouse moves in the opposite direction).

In one embodiment of the invention, a subset (one or more) of the optical sensing elements of the imaging array is used when the optical mouse in operated in a barcode reading mode. These elements form a sub-array. For example, the group of four optical sensing elements 408 might be used. The outputs from the subset of elements may be combined in various ways. For example, the maximum output could be used, the sum of the outputs could be used, or the median output could be used. In general, the signal used for barcode reading is a function of the outputs from the sub-array.

Figure 5:
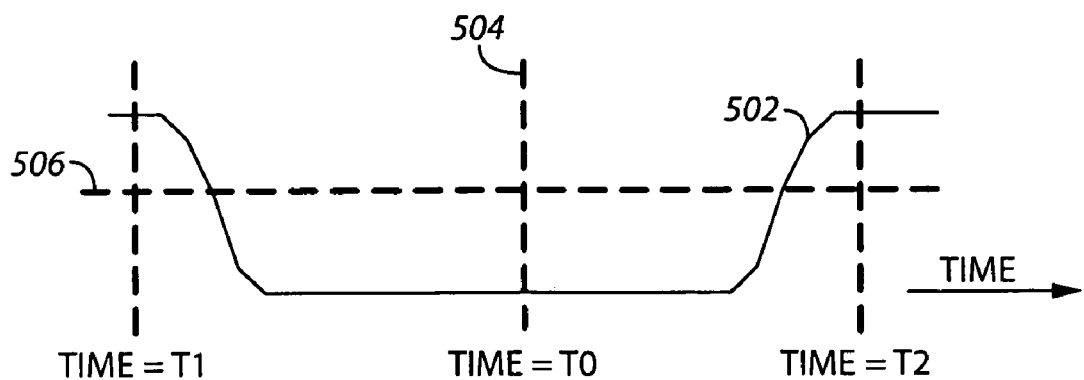
FIG. 5 is a graph of a signal generated by an optical computer mouse consistent with an embodiment of the invention.

FIG. 5 is a graph of signal generated by an optical computer mouse consistent with an embodiment of the invention. FIG. 5 shows the sum 502 of the four voltage outputs from the subset of optical sensing elements 408 as a function of time as the dark portion 404 of the barcode moves across the imaging array 400 in the direction of the arrow 406. At time T0, 504, the sum of outputs 502 is low since all four optical sensing elements are in a dark region as shown in FIG. 4. At an earlier time, T1, the dark portion 404 had not reached the sub-array, so the sum of outputs 502 is high. At a later time, T2, the dark portion 404 has passed the sub-array, so the sum of outputs 502 is again high.

The signal 502 may be converted into a binary or logic signal by comparing the signal 502 to a threshold level 506 that lies between the maximum and minimum levels of the signal.

The use of a subset of optical sensing elements rather than the whole array of elements reduced the amount of processing required to be performed by the processor of the imaging system. This, in turn, allows the frame-rate of the imaging system to be faster than when the optical mouse is in a navigation mode. The increased frame-rate improves the accuracy of the barcode reader and allows faster scanning. For example, a frame rate of 6469 frames per second allows accurate barcode reading for motions as fast as 40 inches per second.

In navigation mode, the optical mouse performs an analysis of consecutive image frames to detect motion of the mouse across the surface. This analysis may include a correlation for example. To enable further reduction in processor requirements, the analysis for motion detection may be disabled when the mouse is in the barcode reading mode.

If an automatic gain control (AGC) is used when the mouse is in a navigational mode, the AGC may be disabled when the barcode reading mode is selected.

The shutter opening time of the imaging system may be set to maximize the contrast between black and white regions when the mouse is in the barcode reading mode.

An advantage of the present invention is that the optical mouse can operate in navigation mode or barcode reading mode with the same set of components.

The communication between the imaging system and the microcontroller may be altered dependent upon which mode the mouse is operating in.

Figure 6:
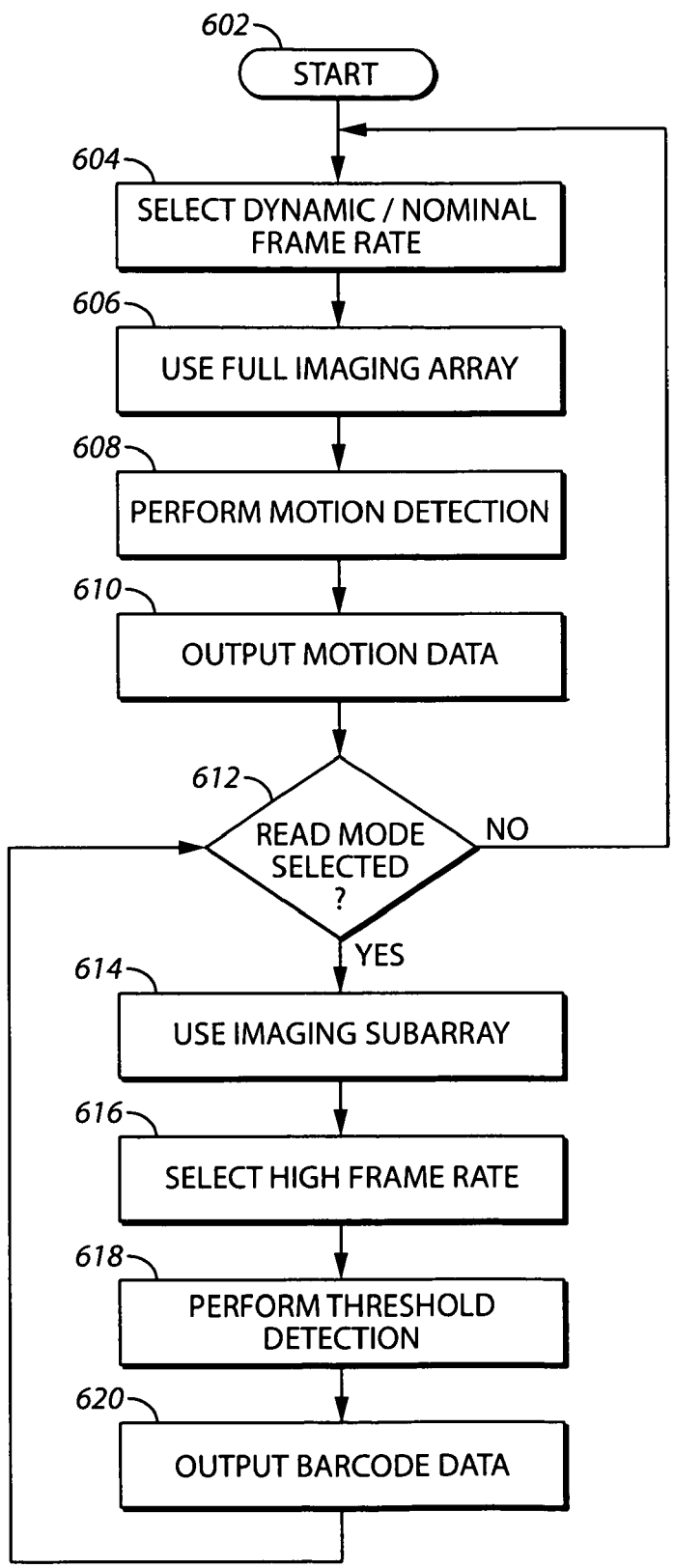
FIG. 6 is flow chart of a method of operation of an optical computer mouse consistent with an embodiment of the invention.

A flow chart of a method consistent with an embodiment of the invention is shown in FIG. 6. Following start block 602 in FIG. 6, the imaging system of an optical mouse is set to operate at a dynamic or nominal frame rate consistent with navigation at block 604. The dynamic frame rate is adjustable to allow control of the navigation performance. At block 606, the full imaging array is selected, that is, all of the optical sensor elements of the imaging array are to be processed. At block 608, the imaging system is operated to perform motion detection using consecutive image frames from the imaging array. At block 610 data describing the motion is output to enable navigation of a computer screen. At decision block 612 a check is made to determine if the user has selected the barcode reading mode of operation (the read mode). In the read mode of operation the optical mouse is configured to operate as a barcode reader. The read mode may be selected by the user holding or pressing a switch or button on the optical mouse. If the read mode has not been selected, as depicted by the negative branch from decision block 612, flow returns to block 604 and the mouse continues to operate in a navigation mode. If the read mode has been selected, as depicted by the positive branch from decision block 612, flow continues to block 614. At block 614, a sub-array of optical sensor elements of the imaging array is selected for processing and at block 616 a higher frame rate is set. The higher frame rate is possible because the sub-array requires less processing. At block 618 the image array performs threshold detection based on the output from the elements of the sub-array. The individual outputs from the sub-array elements may be combined by summing, by using the maximum output, or by using the median output, or by using a weighted sum of outputs, for example. The output is compared to a threshold level to provide binary barcode data that is output at block 618. In a further embodiment, the barcode data is analyzed by the imaging system to estimate the widths of the bar code lines. The width values are then output as a data stream to a computer for decoding. In a still further embodiment, the barcode data is analyzed and decoded by the imaging system. The decoded is then output to a computer.

Following block 620, flow returns to decision block 612, where a check is made to determine if the mouse should continue to operate in a barcode reading mode or switch back to a navigation mode.

In FIG. 6, switching between the navigation mode and the barcode reading mode is achieved by polling a switch value. Alternatively, as described above, switching between the modes may be achieved by generation of an interrupt signal.

While the invention has been particularly shown and described with reference to a preferred embodiment, it will be understood by those skilled in the art that various changes in form and detail may be made therein without departing from the spirit and scope of the invention. Further, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. An optical computer mouse comprising:
a support structure operable to move across a work surface;
an illumination source, coupled to the support structure, operable to illuminate a region of the work surface;
an imaging system, coupled to the support structure comprising:
an optical sensor array operable to sense light from the illuminated region of the work surface; and
an image processor operable to receive signals from the optical sensor array; and
a switch operable to switch the optical computer mouse between a navigation mode of operation, in which the image processor is operable to detect motion of the optical computer mouse over the work surface, and a barcode reading mode of operation, in which the image processor is operable to sense a barcode pattern as the optical computer mouse is moved across a barcode, wherein the image processor of the optical computer mouse is operable to receive signals from only a sub-array of elements of the optical sensor array when the optical computer mouse is operated in the barcode reading mode.

2. An optical computer mouse in accordance with claim 1, wherein the image processor is operable to sense the barcode pattern by comparing a sum of the outputs of the sub-array of elements of the optical sensor array to a threshold level when the optical computer mouse is operated in the barcode reading mode.

3. An optical computer mouse in accordance with claim 1, wherein the image processor is operable to sense the barcode pattern by comparing a maximum of the outputs of the sub-array of elements of the optical sensor away to a threshold level when the optical computer mouse is operated in the barcode reading mode.

4. An optical computer mouse in accordance with claim 1 wherein the image processor is operable to sense the barcode pattern by comparing a median of the outputs of the sub-array of elements of the optical sensor away to a threshold level when the optical computer mouse is operated in the barcode reading mode.

5. An optical computer mouse in accordance with claim 1, wherein the image processor is operable to receive signals from the optical sensor array at a first frame rate when the optical computer mouse is operated in the navigation mode and at a second frame rate, greater than the first frame rate, when the optical computer mouse is operated in the barcode reading mode.

6. An optical computer mouse in accordance with claim 1, wherein the imaging system further comprises a shutter for controlling the passage of light from the work surface to the optical sensor array, wherein the shutter opening time is set to maximize the contrast between light and dark regions of the work surface when the optical computer mouse is operated in the barcode reading mode.

7. An optical computer mouse in accordance with claim 1, further comprising a microcontroller operable to control operation of the optical computer mouse and communication between the optical computer mouse and a computer.

8. A method of operation for an optical computer mouse having a barcode reading capability, the method comprising:
if the optical computer mouse is in a navigation mode of operation,
receiving a first plurality of signals from an array of optical sensing elements at a first frame rate;
processing the first plurality of signals to estimate motion of the optical computer mouse over a surface to produce motion data; and
outputting the motion data; and
if the optical computer mouse is in a barcode reading mode of operation,
receiving a second plurality of signals from only a sub-array of elements of the array of optical sensing elements at a second frame rate;
processing the second plurality of signals to estimate the presence of a barcode pattern to produce barcode data; and
outputting the barcode data.

9. A method in accordance with claim 8, wherein the second frame rate is greater than the first frame rate.

10. A method in accordance with claim 8, wherein processing the first plurality of signals comprises comparing consecutive frames of signals from the away of optical sensing elements.

11. A method in accordance with claim 8, wherein processing the second plurality of signals comprises:
comparing a function of the second plurality of signals to a threshold level;
setting the barcode data to a first binary level, if the function of the second plurality of signals is greater than the threshold level; and
setting the barcode data to a second binary level, if the function of the second plurality of signals is less than the threshold level.

12. A method in accordance with claim 8, further comprising selecting the navigation mode of operation or the barcode reading mode of operation dependent upon the position of a switch on the optical computer mouse.

13. A method in accordance with claim 12, wherein the switch generates an interrupt signal that interrupts a processor of the optical computer mouse.

14. A method in accordance with claim 11, wherein processing the second plurality of signals further comprises:
determining the length of time for which the function of the second plurality of signals is greater than the threshold level; and
determining the length of time for which the function of the second plurality of signals is less than the threshold level.

15. A method in accordance with claim 11, wherein the function of the second plurality of signals is a sum of the second plurality of signals.

16. A method in accordance with claim 11, wherein the function of the second plurality of signals is a maximum of the second plurality of signals.

17. A method in accordance with claim 11, wherein the function of the second plurality of signals is a median of the second plurality of signals.

* * * * *